United States Patent [19]
Higgins

[11] Patent Number: 4,633,347
[45] Date of Patent: Dec. 30, 1986

[54] MAGNETIC TAPE TRANSPORTS

[75] Inventor: Warwick A. Higgins, Bridgewater, England

[73] Assignee: EMI Limited, Hayes, England

[21] Appl. No.: 563,612

[22] Filed: Dec. 20, 1983

[51] Int. Cl.⁴ .................... G11B 5/008; G11B 15/00
[52] U.S. Cl. ...................................... 360/90; 226/190; 242/76; 360/130.21
[58] Field of Search ............... 360/90, 130.21; 226/194, 190, 187; 242/76, 157

[56] References Cited

U.S. PATENT DOCUMENTS

| 3,326,440 | 6/1967 | Barnes | 360/90 X |
| 3,595,584 | 7/1971 | Camras | 360/90 X |

OTHER PUBLICATIONS

*Modern Instrumentation Recording*, pp. 1, 70–75, published by EMI Technology Inc. in 1978 (2nd ed).

*Primary Examiner*—A. J. Heinz
*Attorney, Agent, or Firm*—Fleit, Jacobson, Cohn & Price

[57] ABSTRACT

A damped inertia roller for reducing tape flutter in a magnetic tape transport comprises an outer cylindrical hollow shell which encloses a centrally bored cylindrical flywheel rotatably mounted about an axial shaft. The shaft is rigidly fixed to a closed end face of the hollow shell, and a resilient damping washer is sandwiched between an end of the flywheel and the closed end face of the shell. A second resilient damping washer is sandwiched between the other end of the flywheel and a disc shaped retaining member. The shaft is recessed within the flywheel bore, and has a threaded axial hole in its recessed end face.

A retaining screw passing through the retaining member and the second washer is threaded into this axial hole, and adjustment of its tightness provides a means of adjustably compressing the washers to control the damping of the roller.

13 Claims, 6 Drawing Figures

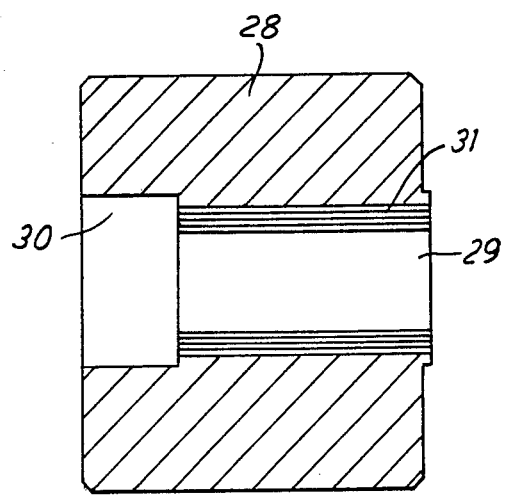 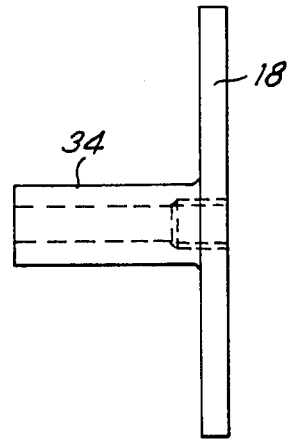
FIG.4  FIG.5
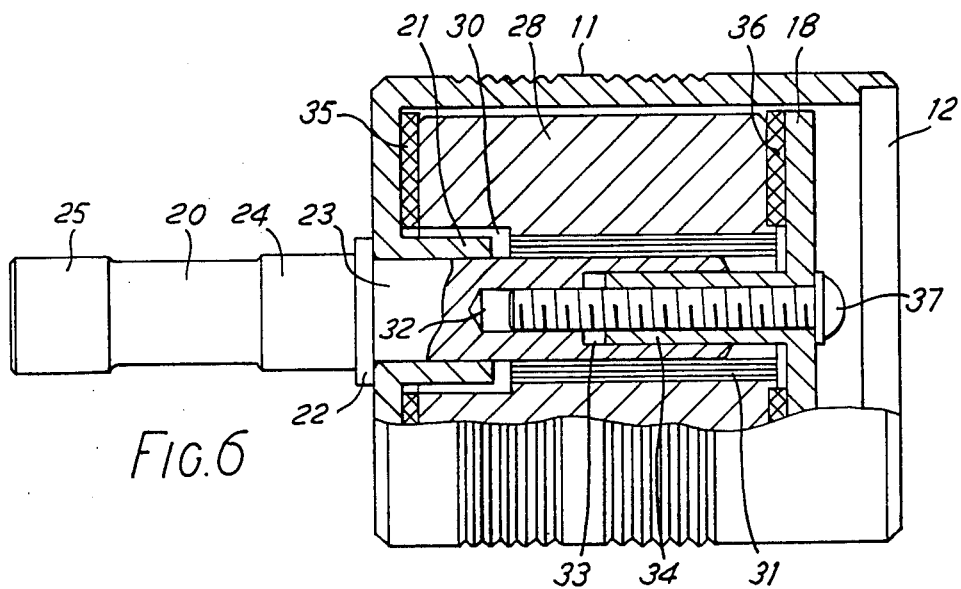
FIG.6

MAGNETIC TAPE TRANSPORTS

FIELD OF THE INVENTON

The function of a magnetic tape transport is to provide a controlled passage of magnetic tape over one or more recording heads. It is particularly important in an instrumentation recorder that the tape should pass over the heads with a uniform velocity. Non-uniformity in velocity, known as flutter, gives rise to unwanted modulation of amplitude and frequency of recorded and replayed signals and the design of a magnetic tape transport for high quality instrumentation recorders aims to minimise the flutter caused by various mechanical imperfections.

DESCRIPTION OF RELATED ART

In recent designs of instrumentation recorders, flutter has been further reduced by including a fluid damped inertia roller in the tape path close to the recording heads. A fluid damped inertia roller comprises an outer hollow cylinder which is coupled to an inner flywheel by means of a viscous fluid. The outer roller is driven by the tape, and the effect of the inertia of the flywheel in combination with the damping of the viscous fluid is to attenuate high frequency variations in tape velocity, i.e. to attenuate high frequency flutter components. While such an inertia roller is effective in flutter attenuation, it suffers from the disadvantage that once a particular geometry of roller has been designed, the damping performance is wholly dependent on the viscosity of the damping fluid, and, apart from the selection of an alternative fluid, no means of adjustment of damping is possible. Furthermore, the viscosity of a damping fluid is to some extent temperature dependent, and the extent of flutter attenuation may vary with ambient temperature. A further disadvantage which may occur with such a device in service is the leakage of damping fluid due to wear and ageing of bearings and seals, and any such fluid on the outer surface of the roller is likely to cause slippage and contamination of the magnetic tape.

SUMMARY OF THE INVENTION

It is an object of the invention to provide an improved damped inertia roller for a magnetic tape transport.

According to the invention there is provided a damped inertia roller for a magnetic tape transport comprising an outer substantially cylindrical hollow shell, and a flywheel rotatably mounted within said shell to be co-axial with said shell, said shell being mechanically coupled to said flywheel by means of at least one layer of a resilient damping material between adjacent surfaces of said shell and said flywheel such that the inertia and the damping of the roller are effective in reducing tape flutter in said tape transport.

According to a further aspect of the invention, adjuster means are provided to adjustably compress said layer or layers of resilient material, thereby providing a means of adjusting the damping of said roller.

DESCRIPTION OF THE DRAWINGS

An embodiment of the invention will now be described, by way of example, with reference to the accompanying drawings in which:

FIG. 4 is a diametric sectional view of a flywheel and bearing assembly, FIG. 5 is a side view of a flywheel retaining member, and FIG. 6 is a side view of a damped inertia roller shown partly in diametric section.

DETAILED DESCRIPTION

Figure 1:
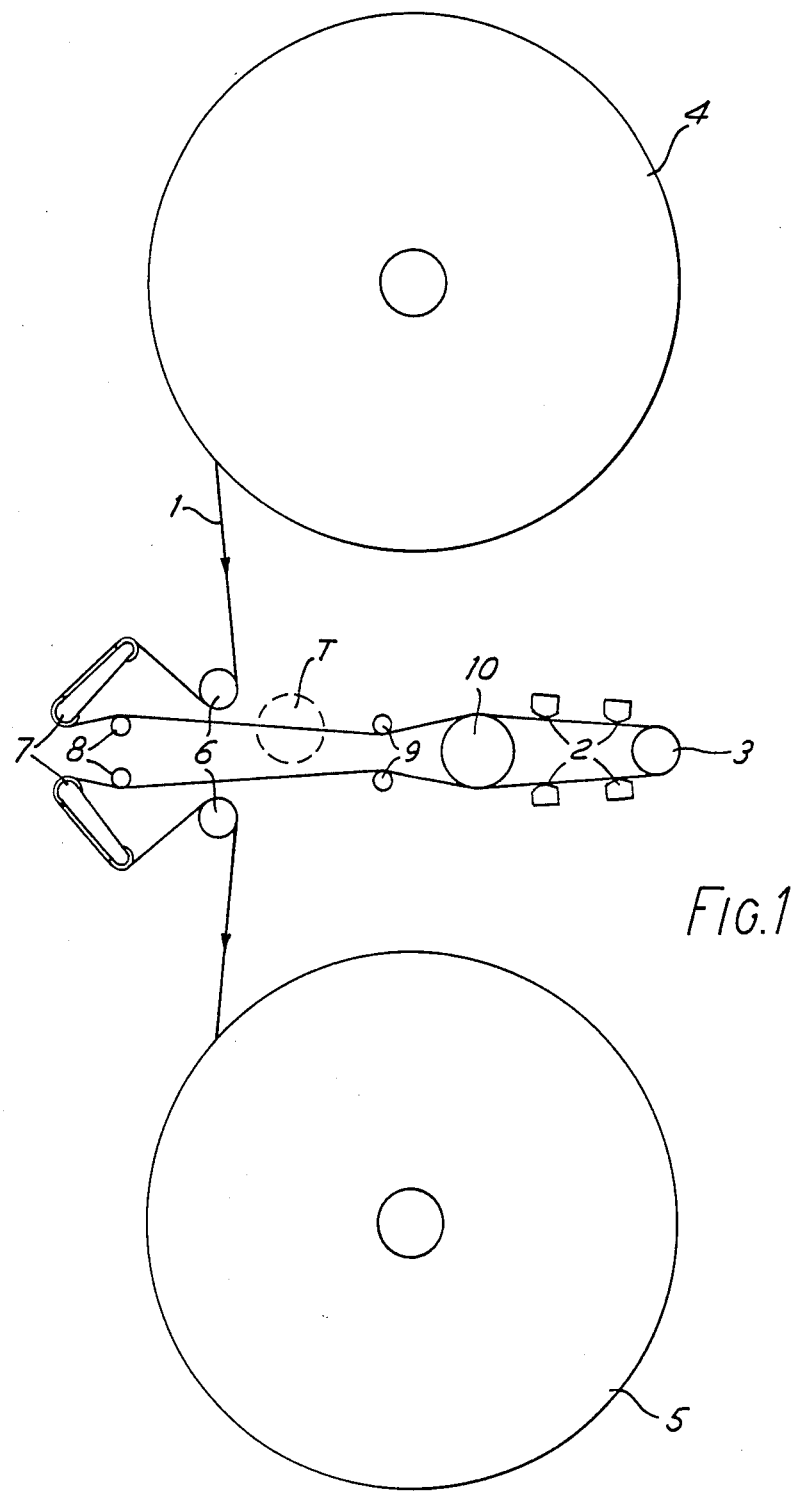
FIG. 1 is a diagram of a magnetic tape transport incorporating a damped inertia roller.

A magnetic tape transport for an instrumentation recorder incorporating a damped inertia roller is shown diagrammatically in FIG. 1. The transport is of a balance tension symmetrical open loop design whose general principles of operation are described in the engineering handbook "Modern Instrumentation Recording", page 73, published by EMI Technology Inc. in 1978. Magnetic tape 1 is driven between tape reels 4 and 5 over two pairs of recording heads, 2, by a high friction capstan 3 which rotates at constant speed. The tape path, which forms an open loop to one side of the capstan, includes a pair of outer guide rollers 6, a pair of tensions arms 7, and two pairs of fixed guides 8 and 9. A built in tape cleaner may optionally be provided at position T. A damped inertia roller 10 is positioned across the open loop to be symmetrically driven by tape contacting and slightly wrapping round the roller in its path both before and after contacting the capstan and recording heads. The damped inertia roller is mounted in freely running bearings close to the recording heads, and its inertia and damping are effective in substantially attenuating flutter of tape velocity in the vicinity of the recording heads.

Figure 2:
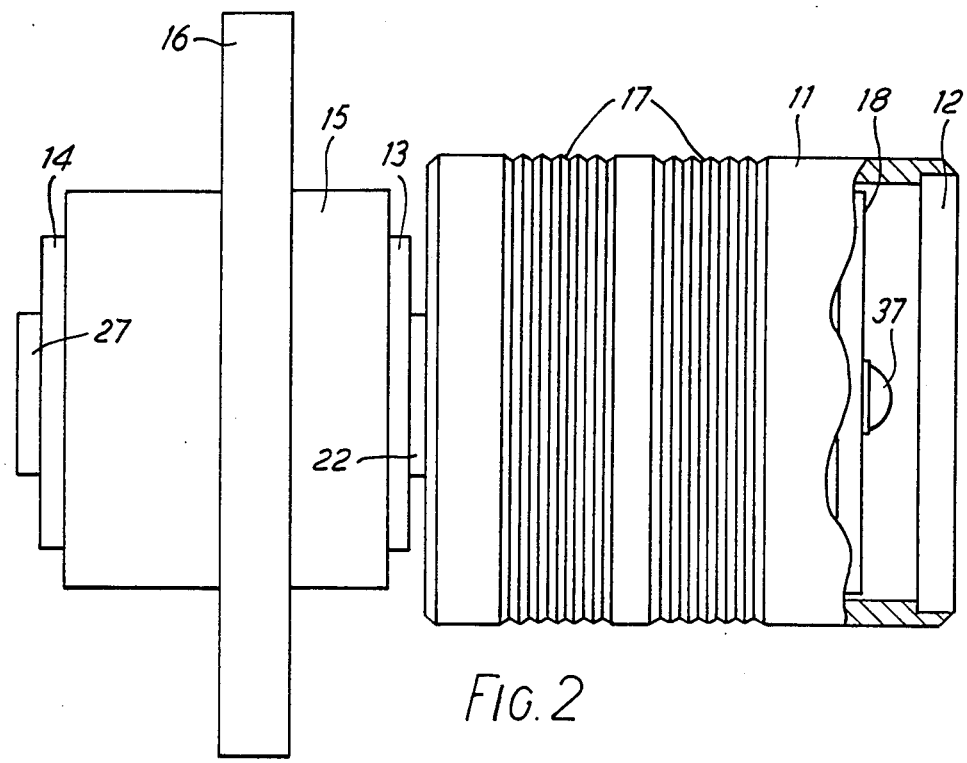
FIG. 2 is a side view of a damped inertia roller and bearing assembly shown partly in diametric section.

FIG. 2 shows an improved damped inertia roller assembly according to the invention. The roller has an outer cylindrical shell 11 of aluminium alloy with a removeable end plate 12. The cylindrical shell is rigidly attached to an axial steel shaft, partially shown at 22, which extends into a bearing housing 15 to be rotatably supported by a pair of bearings 13, 14 which are partially recessed into opposing faces of the housing. The bearing housing of of substantially cylindrical shape with an annular protrusion 16 which provides a mounting plate for assembly to a tape transport baseplate. The exterior surface of the roller shell 11 has grooves 17 in the region of tape contact which prevent the formation of an air bearing between the tape and the roller. The roller shell contains a co-axially mounted damped flywheel which is supported by means of a retaining member and a fixing screw which are partially shown at 18 and 37 respectively.

Figure 3:
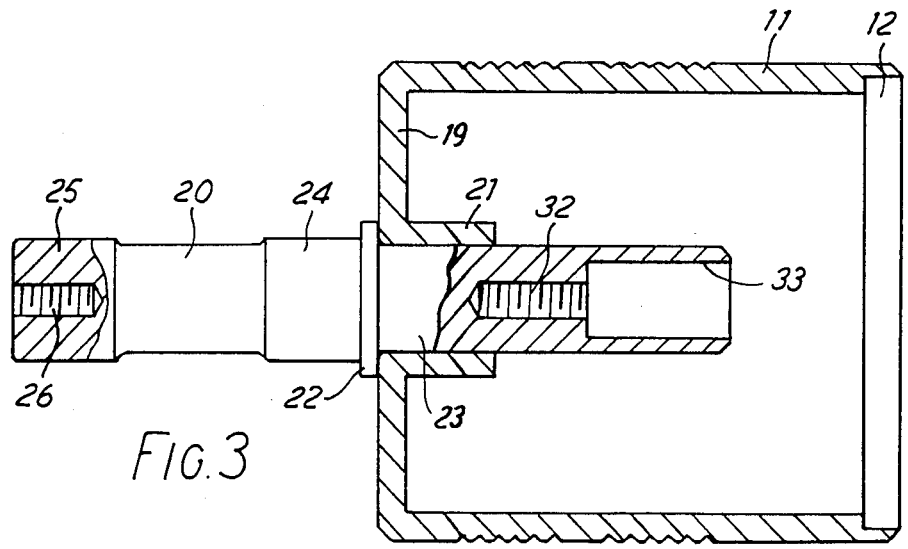
FIG. 3 is a side view of an inertia roller shell assembled to a shaft, shown partly in diametric section.

FIG. 3 shows the assembly of the axial steel shaft 20 to the roller shell 11. The end face 19 of the shell which faces the bearing housing has an inwardly extending tubular portion 21 into which the portion 23 of the shaft tightly fits to form a rigid assembly. The portions 24 and 25 of the shaft fit into the bearings 13 and 14 of FIG. 2 respectively and an annular raised portion 22 provides locating shoulders for assembly of the roller shell and bearing assembly to the shaft. An axial threaded hole into the shaft at the bearing housing end permits the bearing housing to be held in position by means of a fixing screw and a metal retaining washer 27 shown in FIG. 2.

A sectional view of a cylindrical flywheel is shown in FIG. 4. The flywheel 28 is of solid brass, having an axial through-hole 29 and a counterbore 30 at one end. A plastic bush 31 fits into the axial through hole, the inner diameter of the bush corresonding with the outer diameter of the portion 23 of the axial shaft, such that the flywheel may be assembled to the shaft within the roller shell, the bush forming a resilient low friction bearing. Suitable plastic materials for the bush may comprise nylon or polytetrofluoroethylene. The counterbore 30 provides a clearance for entry of the tubular portion 21 of the roller shell when the flywheel is assembled to the axial shaft. The end of the shaft within the roller shell has an axial threaded hole 32 counterbored at 33, FIG. 3. A flywheel retaining member comprising an aluminium disc 18 with an axially extending tubular portion 34 is shown in FIG. 5.

The assembled damped inertia roller is shown in FIG. 6. The manufacturing sequence is to first fit the roller shell 11, with the end plate 12 removed, to the axial shaft 20. A damping washer 35 of a resilient material is then placed inside the roller shell to contact the end face 19 of the shell and surround the tubular portion 21 of the roller shell. The flywheel 28 and plastic sleeve 31 are assembled to the shaft inside the roller shell such that the inner end face of the flywheel is adjacent to the damping washer 35. The flywheel is dimensioned such that neither its outer cylindrical surface nor its inner counterbored portion are permitted to contact the roller shell. The outer end face of the flywheel has an annular recess to support a second resilient damping washer 36 such that the washer 36 is proud of the unrecessed portion of the flywheel end face.

The flywheel retaining member is assembled such that the disc portion 18 lies adjacent to the damping washer 36, its central tubular portion 34 sliding into the counterbore 33 in the axial shaft. A retaining and adjusting screw 37 extends through the tubular portion 34 and screws into the threaded axial hole 32 in the axial shaft 20. It will be seen that there is no metal to metal contact between the flywheel and the remainder of the assembly, the only surfaces contacting the flywheel being on the resilient damping washers at each end face and on the plastic bush 31 in the axial through hole 29. Adjustment of the tightness of the screw 37 provides a means of controlling the mechanical coupling and damping between the outer shell 11 and the inner flywheel 28. The damping washers 35 and 36 are of a soft plastic material, for example a polyurethane polymer material. A suitable such material is commercially available under the proprietary name "SORBOTHANE" (British Registered Trade Mark) obtainable from Birmingham and Leyland Rubber Company Limited. A suitable thickness of washer is in the order of 3 mm.

The adjustment of the screw 37 may be carried out in practice on a tape transport, before the end cap 12 is fitted. The shaft 20 is assembled to the bearing housing with the screw 37 loosely fitted, and the bearing housing is assembled to the tape transport with the damping roller in its normal operating position. A pre-recorded test tape known to have been recorded at a constant frequency under low flutter conditions is replayed on the transport, and the extent of flutter modulation of the replayed signal is observed on an oscilloscope or by other means known to one skilled in the art. While the screw 36 is loose, there is very little mechanical coupling between the roller shell and the flywheel, hence the inertia of the roller is low and there is little attenuation to flutter of the replayed signal. As the screw 37 is tightened the coupling to the flywheel increases, thereby increasig the roller inertia and introducing the damping effect of the two resilient washers 35 and 36. Over-tightening has the effect of reducing the damping as the two resilient washers become over-compressed. At an optimum position of the adjusting screw, the two resilient washers will be compressed such that the mechanical coupling to the flywheel and the damping produce an appreciable attenuation of flutter of the replayed signal. This optimum screw position is found by incrementally tightening the screw 37 and observing the replayed signal flutter at each screw position. The screw 37 is then set in its optimum position by means of a locking adhesive such as "LOCTITE" (British Registered Trade Mark) and the end cap 12 is fastened to the end of the roller shell by means of an adhesive. The damped inertia roller is now fully assembled and adjusted ready for service on a tape transport.

It will be appreciated that the above described embodiment of the invention is by way of example, and other embodiments of the invention will be apparent to those skilled in the art.

What is claimed:

1. A magnetic tape transport including a damped inertia roller, said inertia roller comprising:
    an outer substantially cylindrical hollow shell;
    a flywheel rotatably mounted within said shell to be co-axial with said shell, said flywheel comprising a substantially solid cylinder with two end faces;
    a resilient damping material wherein said shell is mechanically coupled to said flywheel by means of said resilient damping material such that, in operation, the inertia and the damping of the roller are effective in reducing tape flutter in said tape transport;
    said resilient damping material including a first substantially flat washer made of said resilient damping material and a second substantially flat washer made of said resilient damping material, said outer cylindrical shell having at least one substantially closed end, said flywheel being coupled to said cylindrical shell by said first washer being sandwiched between said substantially closed end and an end face of said flywheel, and said second washer being sandwiched between the other end face of said flywheel and a retaining member.

2. A magnetic tape transport according to claim 1 in which said damped inertia roller is adjustable, said roller including adjuster means for adjustably compressing said resilient damping material, thereby providing means of adjusting the damping of said roller.

3. A magnetic tape transport according to claim 1 includes one or more recording heads and a driving capstan in the tape path, said tape path forming an open loop to one side of said driving capstan, said damped inertia roller being positioned across said lóop such that it is driven by tape contacting the roller at positions in the tape path both before and after contacting said recording heads and capstan.

4. A damped inertia roller for a magnetic tape transport comprising:
    an outer substantially cylindrical hollow shell having at least one substantially closed end;
    a flywheel rotatably mounted within said shell to be co-axial with said shell, said flywheel comprising a substantially solid cylinder having two end faces;
    a retaining member;

a resilient damping means for mechanically coupling said shell to said flywheel such that the inertia and the damping of said roller are effective in reducing tape flutter in said tape transport;

said resilient damping means including a first substantially flat washer made of resilient damping material, and a second substantially flat washer made of said resilient damping material wherein said first washer being sandwiched between said substantially closed end of said outer cylindrical shell and one of said end faces of said flywheel, and said second washer being sandwiched between the other of said end faces of said flywheel and said retaining member.

5. A damped inertia roller according to claim 4 in which said resilient damping material comprises a polyurethane polymer.

6. A damped inertia roller according to claim 4 in which said first and second washers each have a thickness of substantially 3 mm.

7. a damped inertia roller according to claim 4 includes an axial shaft rigidly affixed to said closed end of said cylindrical shell and passing through said closed end such that a first portion of said shaft lies outside said cylindrical shell and a second portion of said shaft lies inside said cylindrical shell, said first portion of said shaft extending into bearing means for assembly to said tape transport, said flywheel having an axial bore hole, said second portion of said shaft passing through said first washer and extending into said axial bore hole such that said flywheel is rotatable about said axial shaft.

8. A damped inertia roller according to claim 7 in which a bush or resilient low friction material forms a low friction bearing between said second portion of said shaft and said bore hole in said flywheel.

9. A damped inertia roller according to claim 8 in which said resilient low friction material is PTFE.

10. A damped inertia roller according to claim 8 in which said resilient low friction material is nylon.

11. A damped inertia roller according to claim 7 in which the end face of said second portion of said shaft is recessed in said axial bore hole, said end face of said shaft having an axial threaded hole, said retaining member including a substantially disc shaped portion adjacent said second washer, said disc shaped portion having a central through hole facing said axial threaded hole, said retaining member being connected to said shaft by screw means passing through said through hole and said second washer, and threaded into said axial threaded hole such that said first and second washers may be adjustably compressed by adjusting the tightness of said screw means.

12. A damped inertia roller according to claim 11 in which said axial threaded hole has a central tubular portion extending into said counterbore, said screw means passing through said tubular portion.

13. A damped inertia roller according to claim 4 in which adjuster means are provided to adjustably compress said washers of resilient material, thereby providing a means of adjusting the damping of said roller.

* * * * *